United States Patent [19]

von Bonin et al.

[11] 4,264,645
[45] Apr. 28, 1981

[54] PROCESS FOR IMPROVING THE WATER VAPOR ABSORPTION CAPACITY OF TEXTILE SUBSTRATES

[75] Inventors: Wulf von Bonin; Hellmut Striegler, both of Leverkusen, Fed. Rep. of Germany

[73] Assignee: Bayer Aktiengessellschaft, Leverkusebn, Fed. Rep. of Germany

[21] Appl. No.: 898,743

[22] Filed: Apr. 24, 1978

[30] Foreign Application Priority Data

May 11, 1977 [DE] Fed. Rep. of Germany ....... 2721189

[51] Int. Cl.³ .......................... B05D 3/02; B05D 3/06; B05D 5/00; C08G 9/18
[52] U.S. Cl. ..................................... 427/55; 427/246; 427/381; 427/386; 427/387; 427/389.9; 428/290; 428/904
[58] Field of Search ............... 427/341, 342, 386, 387, 427/390 R, 245, 246, 381, 55, 389.9; 428/290, 904

[56] References Cited

U.S. PATENT DOCUMENTS

| | | | |
|---|---|---|---|
| 3,632,417 | 1/1972 | Brasen | 428/904 X |
| 3,865,622 | 2/1975 | Blair | 428/904 X |
| 3,940,535 | 2/1976 | Gaeth et al. | 427/390 R |
| 3,949,123 | 4/1976 | Steel | 428/904 X |
| 3,985,929 | 10/1976 | von Bonin et al. | 428/290 |

FOREIGN PATENT DOCUMENTS

1095702 12/1967 United Kingdom .
1124271 9/1968 United Kingdom .
1128812 10/1968 United Kingdom .
1172085 11/1969 United Kingdom .
1180863 2/1970 United Kingdom .

OTHER PUBLICATIONS

Gaylord, Norman G., *Polyethers*, pp. 231–233, 1963.

*Primary Examiner*—Michael R. Lusignan
*Attorney, Agent, or Firm*—Gene Harsh; Lawrence S. Pope

[57] ABSTRACT

The present invention is concerned with a method for improving the water storage capacity of textile substrates, particularly fleece based artificial leathers by treatment with a hydrophilizing agent. This agent, once applied to the substrate is insoluble in but swellable in water. The agent in an uncross-linked state is water soluble and has a turbidity point of between about 25° and 95° C. in a 25% aqueous solution. The agent may be applied to the substrate from aqueous solution and then cross-linked or it may be applied to an inert carrier such as kaolin, cross-linked and applied to the substrate from an aqueous suspension. A particularly suitable agent is a polyether with a molecular weight of between 500 and 8500, an ethylene oxide content of about 35 to 80 wt. % and cross-linkable end groups. The end groups may be self cross-linking such as vinyl groups or they may be cross-linkable via a cross-linking promoter such as hexamethylol melamine. These end groups include the hydroxyl groups normally present in polyethers produced from polyalkylene oxides.

12 Claims, No Drawings

PROCESS FOR IMPROVING THE WATER VAPOR ABSORPTION CAPACITY OF TEXTILE SUBSTRATES

BACKGROUND OF THE INVENTION

The finishing of textile substrates, e.g. of synthetic leather based fleeces, with binders is frequently carried out in the known art with a thermosensitized binder liquor. In such a liquor, the binder used is a plastic dispersion which has been adjusted to be heat sensitive. After its introduction into the fleece, the material is heated, so that the binder is completely coagulated and thus fixed in the fleece without leaving a residue and localized. This may be followed by a squeezing off process to remove excess water, and the material is then dried and subsequently cross-linked or vulcanized.

For economic reasons, the materials which are strengthened in this way are in practice mainly comparatively thick fleeces which are split into individual layers after they have been treated with the binder. These stiff layers are then buffed to produce a smooth surface.

The synthetic leathers known in the art, which are manufactured by the process described above or by similar processes, have excellent mechanical properties but they generally do not have the water vapor absorption capacity of natural leather, which is very important for the comfort in wear of articles manufactured from such synthetic leather materials, particularly shoes.

There have therefore been many attempts to remedy this defect by subsequently impregnating the finished synthetic leather fleeces or combining the binders with hydrophilic additives.

It has not hitherto been possible to find a finish which not only increases the water vapor absorption capacity of synthetic leather but also has a combination of the following properties which are very important in practice:

(a) The finishing should not require an additional operating step, i.e. subsequent or previous impregnation and possibly drying and cross-linking of the finished fleeces is undesirable.

(b) In order that the finish may be carried out in a single bath, the hydrophilising agent must be compatible with the binder and auxiliary agents.

(c) The hydrophilising agent must not alter the coagulation point of the thermosensitive binder liquor for a period of several days nor may it deleteriously affect the running stability during impregnation, in order not to cause premature coating of the foulard rollers with coagulate produced by shearing forces during the finishing process.

(d) The hydrophilising agent should be available in a liquid form so that it can easily be mixed with the other components. It must have a sufficiently low viscosity not to interfere with the impregnating process but must be sufficiently highly concentrated so that sufficient quantities thereof can be incorporated in a single process step.

(e) The hydrophilising agent contained in the finishing liquor should be uniformly deposited in the fleece together with the binder in order to ensure homogeneous distribution. During the drying process, it should not migrate with the water which is removed by drying. The external surfaces of the article should not contain more hydrophilising agent than the core of the fleece so that the layers obtained by splitting do not differ from each other in their water storage capacity.

(f) The hydrophilising agent applied to the fleece should be capable of being cross-linked and thereby rendered insoluble in water and should not be capable of being removed by dissolving when subsequently exposed to moisture. The cross-linking process should be completed under the conditions employed for cross-linking or vulcanizing the binder.

(g) It is particularly important that the introduction of sufficient quantities of hydrophilising agent should not deleteriously affect the handle of the finished fleece and in particular it should not harden the fleece.

(h) The processes of splitting and buffing which follow the finishing process should not be rendered more difficult, for example by the premature addition of buffing paper because the hydrophilising agent has thermoplastic properties.

None of the hydrophilising agents hitherto proposed meet all the requirements mentioned above; at most, they satisfy only some of them, so that the problem of finding a suitable hydrophilising agent remained.

SUMMARY OF THE INVENTION

The present invention relates to a process for improving the water vapor absorption capacity of textile substrates, in particular of synthetic leather based fleeces, by treating them with a hydrophilising agent, characterized in the the hydrophilising agent used is a polymeric organic compound which is cross-linked and/or capable of being cross-linked and which is water-soluble in the uncross-linked state, and which, when in the form of a 25% by weight aqueous solution, has a turbidity point of between 25° and 95° C. Preferred are those water-soluble polymeric organic compounds which, in the cross-linked state, are insoluble in water and yet capable of swelling, and which, in the uncross-linked state, have turbidity points of between 30° and 60° C. in 25% by weight aqueous solution.

It has been found that the process according to the invention produces excellent results, particularly in accordance with the requirements listed above, if the hydrophilising agents used are copolymers of ethylene oxide and at least one other epoxide component, in particular propylene oxide, which carries cross-linkable end groups, particularly compounds of the type of methylol compounds.

The copolyether of ethylene oxide and at least one other epoxide component such as, preferably, propylene oxide but possible also, for example, butene oxide, cyclohexene oxide, epichlorohydrin or styrene oxide can easily be prepared according to the known art as mixed block polyethers or block mixed polyethers or statistically mixed polymers by reaction of the epoxides with a starter alcohol, usually under alkaline catalysts and continuing polymerization, the functionality of the resulting mixed polyether depending on the functionality of the starter alcohol, whether it is, for example a monohydric alcohol such as methanol or butanol, a diol such as glycol or propylene glycol or a polyol such as glycerol, trimethylol propane, pentaerythritol, sugar or sorbitol, etc.

DETAILED DESCRIPTION OF THE INVENTION

Mixed polyethers which are particularly suitable for the purpose of the invention are preferably trifunctional but difunctional or tetra or polyfunctional mixed polyethers may also be used. A certain proportion, up to 50% by weight, of monofunctional polyethers may also be included.

The mixed polyethers have molecular weight of between about 500 and 8500, preferably between about 2000 and 7000. As used herein the term molecular weight refers to number average molecular weight.

Particularly preferred hydrophilising agents are those mixed polyethers in which from about 35 to 80% by weight, preferably from about 40 to 75% by weight of ethylene oxide is incorporated, propylene oxide being preferably also incorporated as another essential component apart from the starter alcohol.

The hydrophilising agents to be used according to the invention are preferably mixed polyethers of the type mentioned above which have cross-linkable end groups, i.e. groups which after application during the finishing process allow the applied mixed polyethers to be fixed on the substrate or the binder or which allow them to be fixed by a reaction with each other or with a cross-linking reagent to form an insoluble cross-linking product or by a combination of one or more of these possibilities.

Since the finishing process in most cases takes place in an aqueous medium and is followed by drying and cross-linking at temperatures which may reach 150° C., the cross-linking reaction should not be severely disturbed by moisture or by access of air but cross-linking temperature of up to about 150° C. are quite acceptable and commonly employed.

Suitable groups which can be cross-linked, apart from the hydroxyl group which is in any case present as a result of the method of preparation employed, which hydroxyl group can be cross-linked with, for example, aldehydes to form acetals or formals or with N-methylol compounds such as methylolureas or melamine-N-methylol methyl ethers, also include, for example, carboxyl groups which have been formed by semi-ester formation with acids such as phthalic acid, maleic acid, succinic acid or adipic acid and which may also be cross-linked with methylol compounds. Unsaturated groups may also be cross-linked, e.g. the groups obtainable by esterification of the hydroxyl end groups with (meth)-acrylic or maleic or fumaric acid; also allyl ether groups, which incidentally are capable of radical cross-linking on their own or with the binder, to which an additional cross-linker such as triallylcyanurate, acrylamide methyl ether or divinylbenzene may be added.

Particularly interesting is the conversion of the hydroxyl end groups of the mixed polyether into N-methylolalkyl ether-urethane groups, which can easily be carried out e.g. by reaction of the mixed polyethers with methoxymethyl isocyanate. This type of cross-linkable group can easily be cross-linked with itself or with hydroxyl carboxylic acid or amide groups by the action of heat, optionally in the presence of acid catalyst.

Mixed polyethers with cross-linkable end groups represented by the following general formula I:

Mixed polyether chain

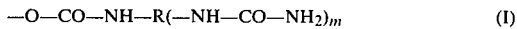
(I)

or their reaction products with formaldehyde are particularly preferred because they are highly reactive when treated with the usual reagents and can be prepared by simple processes and give rise to very satisfactory properties within the meaning of the requirements according to this invention.

In the above formula (I), R represents an aliphatic, cycloaliphatic, araliphatic or aromatic group derived from a $(1+m)$ functional isocyanate, where m is an integer of from 1 to 3, but preferably 1, i.e. R is preferably derived from a bifunctional isocyanate.

These mixed polyethers with cross-linkable end groups which are preferred as hydrophilising agents according to the invention are prepared by conventional methods in which the mixed polyether which carries the hydroxyl end groups or mixtures of such mixed polyethers are first reacted with a preferably bifunctional isocyanate to be converted into a so-called isocyanate prepolymer or polyether isocyanate in which the majority of the hydroxyl groups of the polyether have reacted half sidedly with the bifunctional isocyanate so that the original polyether, for example a triol, has given rise predominantly to a triisocyanate. This generally requires the use of a certain stoichiometric excess of isocyanate, and the resulting prepolymer therefore contains a small amount of free diisocyanate, but this does not interfere with subsequent processing. The prepolymer prepared in this way, which may also be regarded as a polyfunctional polyether isocyanate in which the polyether portion is strongly hydrophilic on account of the given composition, is then reacted with aqueous ammonia. In this reaction, the urea structure shown in the general formula is formed very easily and an aqueous solution of the hydrophilising agent required for the process is obtained. To this solution is now preferably added a sufficient quantity of formaldehyde to produce a slight odor of formaldehyde, and the solution can then be used for the purpose of the invention, if indicated after several hours' stirring at 15° to 60° C., followed by cooling.

Any known aliphatic, cycloaliphatic, araliphatic or aromatic di-, tri- or polyisocyanates may be used for preparing the isocyanate prepolymer or polyether isocyanate. It is preferred to use diisocyanates such as hexamethylene diisocyanate, isophorone diisocyanate, 2,4- and/or 2,6-tolylene diisocyanate or 4,4'- and/or 2,4'-diphenylmethane diisocyanate.

Commercially available mixtures of tolylene diisocyanate isomers are particularly preferred on account of their suitable reactivity and ready availability although aliphatic isocyanates such as isophorone diisocyanate or hexamethylene diisocyanate have advantages with regard to their resistance to ageing by the action of light.

The reaction of the resulting polyether isocyanate with ammonia is preferably, but not necessarily, carried out with aqueous ammonia using any quantity of water but preferably a quantity which allows the polyether urea to be obtained directly as a 5 to 60% solution. The quantity of ammonia used should be at least equivalent to the number of free isocyanate groups present but should preferably be 2 to 3 times this quantity. The quantity of formaldehyde subsequently added to the polyether urea should be equivalent to the quantity of ammonia used but is preferably about 1.5 to 2 times this quantity.

Other known cross-linking agents may, of course, also be used instead of formaldehyde, e.g. resoles or N-methylol compounds of urea, of melamine or urethanes, biurets or allophanates or their ethers, for example tris-methylol urea or hexamethylolmelamine or their methyl ethers.

Cross-linking of the hydrophilising agents according to the invention is suitably carried out by a method similar to the cross-linking of other methylol compounds aided by catalysis with acid reagents such as oxalic acid, maleic acid, ammonium chloride, phosphoric acid or the like. These catalysts are used in quantities of up to about 3% by weight, preferably up to about 1.5% by weight, based on the hydrophilising agent. Cross-linking is also achieved without these additives but in that case requires higher temperatures or longer times. It is normally carried out at temperatures between about 80° and 180° C., preferably at about 110° to 150° C.

According to the invention, the thermosensitive, cross-linkable and binder compatible hydrophilising agent used in the impregnating bath are preferably urea mixed polyethers of the general formula I or their formaldehyde reaction products, in which m is preferably 1, R is preferably a tolyl group and the mixed polyether component is preferably derived from a trifunctional ethylene oxidepropylene oxide mixed polyether containing from about 40 to 65% by weight of ethylene oxide built into it and having a molecular weight of from 2000 to 7000.

The hydrophilising agents are preferably applied from the aqueous phase in quantities such that the amount of solid substance applied is from 5 to 50% by weight, preferably 10 to 35% by weight, based on the weight of the substrate.

According to a particular embodiment of the process, the hydrophilising agent is applied to a hydrophilic carrier substance, e.g. an inorganic asbestos, kaolin, chalk, talcum, powdered rock or wood meal or particularly to finely divided silicate, for example of the type K 322 supplied by Degussa, Frankfurt, and is subjected to a preliminary process of cross-linking by heating the suspension of hydrophilising agent and silicate, which also contains an acid such as oxalic or maleic acid as cross-linking catalyst, to a temperature above the turbidity point of the hydrophilising agent, which lies at temperatures of from about 30° to 60° C., so that the hydrophilising agent is adsorbed on the silicate. After drying and cross-linking at temperatures of between about 100° to 160° C., preferably at about 130° to 150° C., the reaction product is ground to dust (silicate portion about 25 to 80% by weight, preferably about 40 to 70% by weight). The powder thus obtained is then mixed with water to form a suspension in the form of a fine paste which is capable of being impregnated, the suspension having a solids content of preferably about 25 to 40% by weight. This paste is compatible with the binder normally used, for example a thermosensitive butadiene/acrylonitrile copolymer latex. The impregnating mixture also contains other auxiliary agents such as sulphur, vulcanizing agents, accelerators or dyes.

The material obtained after impregnating, drying and vulcanizing is a flexible synthetic leather which has a soft handle and, after it has been split, all of the layers have a uniform water vapor storage capacity.

The following Examples serve to illustrate the process without limiting it. The parts and percentages given are parts by weight and percentages by weight unless otherwise indicated.

The turbidity point is determined by slowly heating a 25% aqueous solution of the hydrophilising agent in a test tube inside a water bath and occasionally stirring it with a thermometer. The temperature at which cloudiness becomes irreversible is recorded.

The capacity to be cross-linked is determined by applying a 25% aqueous solution of the hydrophilising agent to a glass plate, optionally after addition of the cross-linking agent, and then heating it in a drying cupboard at 120° C. for 30 minutes. When subsequently treated in a water bath at 15° to 25° C., the cross-linked material may swell but must not dissolve.

The softness of the cross-linked product gives some indication of the handle which the material may be expected to have after application of the finish. It is assessed subjectively or measured in terms of the Shore A hardness.

The following are examples of mixed polyethers used as bases for the preparation of the hydrophilising agents:

Type A:
 Glycerol is used as starter, on which are polymerized
  60% of ethylene oxide and
  40% of propylene oxide.
 Molecular weight approx. 6500,
 hydroxyl number approx. 26.

Type B:
 Similar to Type A but
 Molecular weight approx. 3000,
 hydroxyl number approx. 56.

Type C:
 Glycerol is used as starter on which are polymerized
  45% of ethylene oxide and
  55% of propylene oxide.
 Molecular weight approx. 6000,
 hydroxyl number approx. 28.

Type D:
 Trimethylolpropane is used as starter on which are polymerized
  45% of ethylene oxide and
  55% of propylene oxide.
 Molecular weight approx. 3000,
 hydroxyl number approx. 56.

Preparation of the hydrophilising agent

Type I:
Thermosensitive hydrophilising agent having carboxyl end groups as groups which are to be cross-linked.

100 Parts of Type D polyether and 10 parts of succinic acid anhydride are stirred together for 10 hours at 80° C. Semi-ester formation takes place. The 25% aqueous solution of the reaction product has a turbidity point at 52° C. 10 Parts of a 40% solution of hexamethylolmelamine methyl ether and 0.5 parts of ammonium chloride are added to 100 parts of the 40% aqueous solution of the reaction product and the mixture is vigorously stirred. A film cast from this solution and cross-linked gives rise to a cross-linked product which only undergoes swelling in the presence of water and is not dissolved by it. Shore A hardness: 18.

Type II:
Thermosensitive hydrophilising agent which can be cross-linked through its unsaturated end groups: This substance is prepared by a similar method to that used for Type I but using maleic acid anhydride instead of succinic acid anhydride. The reaction product has a turbidity point of 53° C.

Acrylamide methylol methyl ether is used as cross-linking agent because it can take part in the cross-linking reaction through both the double bond and by way of the methylol group. 100 parts of the 30% aqueous solution of the hydrophilising agent, 8 parts of acrylamidomethylolmethyl ether and 1 part of ammonium persulphate are vigorously mixed with stirring. A film cast from this solution undergoes cross-linking at 120° C. to form a cross-linked product which is no longer soluble in water but only capable of swelling in it. Shore A hardness: 23.

Type III:

Thermosensitive hydrophilising agent having cross-linkable N-methylol methyl ether-urethane end groups.

100 parts of polyether Type B and 10 parts of methoxy methyl isocyanate are stirred together for 8 hours at 50° C.

The reaction product has a turbidity point at 56° C. 1.0 Part of ammonium chlorides is dissolved in 100 parts of an approximately 50% solution of the hydrophilising agent in water. A film cast from this solution undergoes cross-linking to form a product which is still capable of swelling in water but no longer soluble. Shore A hardness 22.

Type IV:

Thermosensitive hydrophilising agent having cross-linkable end groups according to the general formula I on page 7 (polyether-urea):

1250 Parts of the mixed polyether Type A and 205 parts of a commercially pure mixture of 80% 2,4-tolylene diisocyanate and 20% 2,6-tolylene diisocyanate are stirred together with the exclusion of moisture for 3.5 hours at 80° C. At the end of this time, the reaction product has an isocyanate content of 4.2%.

525 Parts of the polyether isocyanate prepared as described above are then stirred at room temperature into a mixture of 690 parts of water and 79 parts of an approximately 24% aqueous ammonia. An aqueous solution which still smells faintly of ammonia is obtained. 75 Parts of an approximately 37% aqueous formalin solution are added after about 30 minutes. After 24 hours' stirring at approximately 30° C. and cooling to room temperature, the resulting solution of the product has a viscosity at room temperature of 40 seconds, measured in a Ford cup, nozzle 4, and a solids content of approximately 40%. The turbidity point of the hydrophilising agent prepared in this way is approximately 50° C. 1 Part of oxalic acid is added to 100 parts of the solution of hydrophilising agent and the solution is cast to form a film. The film cross-links at 120° C. to form a highly elastic film which swells strongly in water but does not dissolve in it. Shore A hardness 19.

Type V:

Thermosensitive hydrophilising agent with cross-linkable end groups analogous to Type IV:

1293 Parts of the mixed polyether Type C and 208 parts of a commercially pure mixture of 80% of 2,4- and 20% of 2,6-tolylene diisocyanate are stirred together for 3.5 hours at 80° C. with exclusion of moisture. The reaction product obtained at the end of this time has an isocyanate content of 5.2%.

525 parts of this polyether isocyanate are then vigorously mixed with a mixture of 1144 parts of water and 79 parts of an approximately 20% aqueous ammonia at room temperature and the resulting solution is then stirred for a further 30 minutes. 79 parts of an approximately 37% formalin solution are then added and the mixture is stirred at room temperature for approximately 20 hours.

The resulting approximately 30% solution of hydrophilising agent has a throughflow time of 14 seconds measured at approximately 20° C. in a Ford cup nozzle 4. The turbidity point is 37° C. After the addition of 0.5% of maleic acid, based on the solid content, a film prepared from the solution crosslinks at 120° C. to form a highly elastic film which swells in water but does not dissolve in it. Shore A hardness: 26.

Type VI:

Thermosensitive hydrophilising agent analogous to Types IV and V:

262 Parts of the polyether isocyanate prepared by the method given for Type IV and 262 parts by weight of the polyether isocyanate prepared by the method given for Type V are mixed vigorously. The mixture obtained is then mixed vigorously at room temperature with a mixture of 414 parts of water and 79 parts of an approximately 22% aqueous ammonia solution. The resulting mixture is then stirred for a further 30 minutes and 79 parts of an approximately 37% formalin solution are added. After vigorous mixing, the mixture is left to stand for about 24 hours at 25° C. The approximately 50% hydrophilising agent prepared as described above has a throughflow time of approximately 160 seconds measured at 20° C. in a Ford cup, nozzle 4. The turbidity point lies at 41 to 42° C.

After the addition of 0.5 parts of ammonium chloride, a film prepared from this solution cross-links at 80° to 120° C. to form a highly elastic film which undergoes considerable swelling in water but is not water-soluble. Shore A hardness: 24.

The hydrophilising agents of Types IV to VI make it possible to prepare hydrophilic films which have exceptionally good mechanical properties. Since they have excellent compatibility with the usual binders used for synthetic leather fleeces and their turbidity points lie in the very interesting low temperature range, these hydrophilising agents will be used as examples to illustrate the method according to the invention of manufacturing synthetic leather fleeces.

Fleece materials suitable for the process according to the invention are preferably produced from staple fibers although fleeces made of endless filament fibers, for example fibers obtained by the fleece spinning process, may also be used. The fibers used may be either synthetic fibers such as polyamide, polyester, polyolefine or polyacrylonitrile fibers or regenerated fibers such as rayon staple fibers or natural fibers such as wool or cotton fibers, or mixtures of these fibers. Apart from the usual staple fibers, shrinkable fibers may also be used in which the shrinkage is subsequently removed by a heat treatment, e.g. fibers of this kind based on polyesters or polyacrylonitrile.

Manufacture of the fleeces is carried out by the known dry laying or wet laying process and may comprise, for example, the following steps:

(a) Crimping, cross-laying, stitching and optionally shrinking if shrinkable fibers are used, or dispersion of the fibers, formation of sheets and dewatering by suction.

The fleeces are then after-treated and finished by the following steps:

(b) Impregnation, coagulation, drying, vulcanizing;

(c) Splitting and buffing.

EXAMPLES

EXAMPLE 1

A synthetic fiber fleece composed of 60% of polyamide fibers 1.6 dtex/40 mm and 40% of polyester fibers 1.3 dtex/3.8 mm (shrinkable) is produced by crimping followed by repeated stitching. The fleece obtained after shrinkage in hot air has a weight per square meter of 825 g, a thickness of 4.1 mm and a density of 0.2 g/cm$^3$. The fleece is then impregnated with a mixture of a 50% butadiene/acrylonitrile copolymer latex which has been carboxylated by the incorporation of methacrylic acid and the 40% hydrophilising agent type IV according to the invention, used in proportions of approximately 1:1. The following components were added to the mixture to vulcanize the butadiene/acrylonitrile polymer:

| | | |
|---|---|---|
| Colloidal sulphur | 1.5 parts | dispersed in 11 parts of methylene-bis-naphthalene sulphate acid sodium in 5% aqueous solution |
| Zinc-N-diethyldithiocarbamate | 0.8 parts | |
| Active zinc oxide | 2.5 parts | |
| for pigmentation: | | |
| Titanium dioxide (rutile) | 2.0 parts | |
| Vulcanosol orange (manufacturers BASF AG, Ludwigshafen) | 0.2 parts | |
| for stabilizing: | | |
| Benzyl-p-oxydiphenyl polyglycol ether in 20% aqueous solution | 10.0 parts | |
| to adjust the products to be heat sensitive: | | |
| Organopolysiloxane compound according to U.S. Pat. No. 3,255,140 (coagulant WS of Bayer AG) | 0.5 parts. | |

The parts given above are based in each case on 100 parts of dry rubber substance.

The pH of the finishing liquor was 8, the coagulation point 40° C. and the viscosity 200 mPas.

After impregnation and squeezing off, the fleece was passed through an infra-red path acting from both sides with a power of 10 kilowatt from each side. The fleece travelled through this path at a rate of 0.2 m/min. This treatment coagulated the binder. The fleece was then dried and vulcanized (20 minutes at 110° C.). Quantity of solid substance incorporated: 90%, based on the weight of the substrate. The fleece was then split into four layers each approximately 1.0 mm in thickness.

The values for the water vapor absorption capacity are shown in Table I and the most important mechanical properties in Table II.

EXAMPLE 2

The same fleece as in Example 1 was used. Hydrophilising agent Type IV was used for finishing in combination with very finely divided silicate (Type K 322, manufacturers Degussa, Frankfurt) mixed with the binder used in Example 1.

The combination of silicic acid/hydrophilising agent was prepared as follows: A mixture of 1 part of silicate to 5 parts of solution IV with the addition of 0.2% of maleic acid was dried and then after heated at 150° C. for 30 minutes. The product obtained was then milled and 1 part of the milled substance was mixed to a paste with 1.5 parts of water. The suspension thus obtained was mixed in proportions of 1:1 with the binder used in Example 1. The additives described in Example 1 were then added in the quantities indicated there. The mixture was diluted with water to a total solid concentration of 31%. The coagulation point of the diluted mixture was 44° C.

The fleece was impregnated with this mixture and then finished as described in Example 1. Quantity incorporated: 95%, based on the weight of fibers. The values for the water vapor absorption capacity are shown in Table I, the most important mechanical properties in Table II.

EXAMPLE 3 (Comparison example)

The fleece described in Example 1 was impregnated with the same butadiene/acrylonitrile copolymer latex as described in Example 1. No hydrophilising agent was added but the additives given in Example 1 were added in the same quantities as indicated there. The properties of the fleece finally obtained are shown in Tables I and II. Quantity of incorporated binder: 100%, based on the weight of the fibers. Explanations to Table I: measurement of hydrophilic character:

Samples measuring 2×5 cm were removed from the individual layers obtained by splitting the fleeces, and the samples were dried to constant weight. They were then introduced into an air conditioned chamber which was at a relative humidity of 45%, and left therein for 24 hours. The absorption of water vapor was determined quantitatively in relation to time. The water vapor absorption in an air conditioned chamber at 86% relative humidity was then measured over a period of 24 hours. To measure the amount of moisture given off, the samples were again introduced into a chamber at 45% relative humidity and weighed at intervals.

The data shown in the Table represent the changes in weight of the samples due to absorption and release of water vapor of the individual layers. Columns 1 and 4 refer to the outermost layers and columns 2 and 3 to the internal layers.

The data clearly show that the tendency to migration of the hydrophilic finish applied in Example 1 is very slight but still detectable at 85% relative humidity from the low values obtained for the water absorption of the inner layers. In Example 2, this tendency to migration is completely eliminated. The inner layers of the fleece according to Example 3 have virtually no water vapor storage capacity. The higher values of the outer layers compared with those of the inner layers are due to the fact that the emulsifier formed from the latex which was used to bind the fleece migrated to the surface in the course of the drying process, i.e. to what subsequently forms the outer layers. The water vapor storage capacity of the fleece manufactured according to Example 2 is substantially higher in the inner layers than that of the fleece manufactured according to Example 3.

Explanations to Table 2—mechanical values:

The comparison shows that compared to a fleece manufactured according to Example 3, i.e. in accordance with the known art, the addition of hydrophilising agent has no deleterious effect on the mechanical properties of the fleeces.

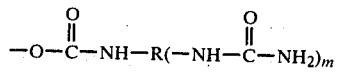

wherein m is an integer of between 1 and 3 and R is the isocyanate free residue of a (m+1) functional tolyl isocyanate or the reaction product of said groups with formaldehyde.

2. The process according to claim 1, characterized in that the water-soluble polymeric compounds used as hydrophilising agents are of the kind which in the cross-linked state are insoluble in water but capable of swell-

TABLE I

| Fleece according to Example No. | Layer No. | Water vapor absorption and release — Increase and decrease in weight in % after storage at | | | | | | | | | Permeability to water vapor in mg/h/cm² |
|---|---|---|---|---|---|---|---|---|---|---|---|
| | | 45% r.H. | | | 86% r.H. | | | 45% r.H. | | | |
| | | 4 h | 8 h | 24 h | 4 h | 8 h | 24 h | 4 h | 8 h | 24 h | |
| 1 | 1 | 1.05 | 1.05 | 1.05 | 2.60 | 2.85 | 4.65 | 1.60 | 1.40 | 1.25 | 21.3 |
| | 2 | 0.70 | 0.95 | 0.95 | 2.40 | 2.60 | 3.90 | 1.60 | 1.30 | 1.20 | |
| | 3 | 0.85 | 1.00 | 1.05 | 2.25 | 2.40 | 3.10 | 1.45 | 1.30 | 1.20 | |
| | 4 | 0.90 | 1.10 | 1.15 | 2.85 | 3.40 | 5.10 | 2.00 | 1.50 | 1.35 | |
| 2 | 1 | 1.05 | 1.05 | 1.05 | 3.65 | 3.70 | 4.10 | 1.30 | 1.25 | 1.15 | 22.7 |
| | 2 | 1.10 | 1.10 | 1.10 | 3.40 | 3.40 | 4.05 | 1.25 | 1.20 | 1.20 | |
| | 3 | 1.10 | 1.10 | 1.10 | 3.50 | 3.55 | 3.95 | 1.25 | 1.25 | 1.25 | |
| | 4 | 1.15 | 1.20 | 1.20 | 3.80 | 3.80 | 4.10 | 1.35 | 1.30 | 1.20 | |
| 3 | 1 | 0.20 | 0.20 | 0.20 | 2.50 | 2.50 | 2.90 | 0.20 | 0.20 | 0.20 | 23.1 |
| | 2 | 0.10 | 0.10 | 0.10 | 1.40 | 1.40 | 1.60 | 0.10 | 0.10 | 0.10 | |
| | 3 | 0.10 | 0.10 | 0.10 | 1.20 | 1.40 | 1.60 | 0.10 | 0.10 | 0.10 | |
| | 4 | 0.20 | 0.20 | 0.20 | 1.60 | 1.70 | 1.90 | 0.20 | 0.20 | 0.20 | |

TABLE II

| | Tensile strength MPa Longitudinal direction | Elongation at break % Traverse direction | Resistance to tearing by needle puncture N/mm | | Tear propagation resistance N/mm | | Stretching in Bally tensometer | | |
|---|---|---|---|---|---|---|---|---|---|
| | | | Long. dir. | Trans. dir. | Long. dir. | Trans. dir. | Linear V % | Permanent V % | Pressure bar |
| Example 1 | 4.9/110 | 12.1/86 | 52.0 | 76.0 | 29.0 | 39 | 25 | 10.0 | 3.2 |
| Example 2 | 6.8/88 | 10.1/116 | 71.0 | 67.0 | 51.0 | 31 | 25 | 13.2 | 2.8 |
| Example 3 | 6.6/109 | 9.3/118 | 71.8 | 57.3 | 41.5 | 31 | 25 | 6.5 | 2.3 |

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. In a process for improving the water vapor absorption capacity of textile substrates by treatment with hydrophilizing agents, the improvement comprising using a hydrophilizing agent which:
   (a) has a turbidity point of between 25° and 95° C. in 25% aqueous solution, and
   (b) is derived from a trifunctional mixed polyether with a molecular weight of between 2000 and 7000 and is comprised of
      (i) 40 to 75 wt. % of ethylene oxide units,
      (ii) alkylene oxide units other than ethylene oxide, and
      (iii) cross-linkable end groups of the formula ing therein and in the uncross-linked state have turbidity points of between about 30° C. and 60° C. in the form of 25% by weight aqueous solutions.

3. The process according to claim 1 characterized in that the hydrophilising agents are used as mixtures with other binders in the course of the usual finishing process.

4. The process according to claim 1 characterized in that the hydrophilising agent is applied in a pre-cross-linked form to a finely powdered carrier substance and is suspended in this form.

5. The process according to claim 4, characterized in that the carrier substance used is silicic acid.

6. The process of claim 1 wherein m represents 1.

7. The process of claim 1 wherein the textile substrate is a synthetic leather based fleece.

8. The process of claim 1 wherein the other alkylene oxide is propylene oxide.

9. A process for improving the water vapor absorption capacity of synthetic leather substrates comprising treating said substrates with an aqueous solution of about 5 to 50 wt.% of a hydrophilising agent based on the weight of substrate wherein said agent (a) has a turbidity point of between about 25° and 95° C. in 25% aqueous solution, and
(b) is derived from a mixed trifunctional polyether with a molecular weight of between about 2000 and 7000 and has
   (i) 40 to 75 wt. % of ethylene oxide units,
   (ii) cross-linkable end groups of the formula

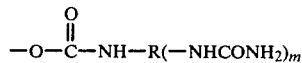

wherein m represents an integer of 1 to 3 and R represents the isocyanate free residue of a tolyl (m+1) functional isocyanate and the reaction product of groups of this formula with formaldehyde and
   (iii) alkylene oxide units other than ethylene oxide, drying the resulting treated substrate and cross-linking said cross-linkable end groups.

10. The process of claim 9 wherein the cross-linking is carried out in the presence of up to about 3 wt. % acid catalyst at between about 80° and 180° C.

11. The process of claims 9 or 10 wherein the hydrophilising agent is prepared by reacting a mixed polyalkylene ether having a molecular weight of between about 2000 and 7000 and between about 40 and 75 wt. % ethylene oxide units with at least two equivalents of a diisocyanate, reacting this product with at least an equivalent amount of ammonia in sufficient water to give a 5 to 60 wt. % solution of this product and reacting this product with between about 1.5 and 2 equivalents of formaldehyde.

12. A process for improving the water vapor absorption capacity of synthetic leather substrates comprising treating said substrates with an aqueous suspension having a solids content of about 25 to 40 wt. % wherein said suspension is prepared by
   (a) preparing a hydrophilising agent having a turbidity point of between about 25° and 90° C. in 25% aqueous solution and based upon a polyether with a molecular weight of between about 2000 and 7000, an ethylene oxide content of about 35 to 85 wt. %, alkylene oxide units other than ethylene oxide and cross-linkable end groups,
   (b) suspending said agent and an inert hydrophilic carrier substance in aqueous media,
   (c) heating the suspension above the turbidity point of said agent causing it to be adsorbed on the carrier,
   (d) drying the carrier and cross-linking said agent by heating at between about 100° and 160° C.,
   (e) grinding the product so obtained to powder, and
   (f) dispersing the powder in aqueous media, and drying the resulting treated substrates.

* * * * *